(12) United States Patent
Passera

(10) Patent No.: US 6,272,449 B1
(45) Date of Patent: Aug. 7, 2001

(54) COMPUTER SYSTEM AND PROCESS FOR EXPLAINING BEHAVIOR OF A MODEL THAT MAPS INPUT DATA TO OUTPUT DATA

(75) Inventor: Anthony Passera, Watertown, MA (US)

(73) Assignee: Torrent Systems, Inc., Cambridge, MA (US)

( * ) Notice: Subject to any disclaimer, the term of this patent is extended or adjusted under 35 U.S.C. 154(b) by 0 days.

(21) Appl. No.: 09/102,349

(22) Filed: Jun. 22, 1998

(51) Int. Cl.[7] .................................................... G06F 17/10
(52) U.S. Cl. ................................................................ 703/2
(58) Field of Search ............................. 395/500.23, 767; 707/6; 703/2, 13–15

(56) References Cited

U.S. PATENT DOCUMENTS

| | | | |
|---|---|---|---|
| 5,734,112 | 3/1998 | Bose et al. ......................... | 73/861.56 |
| 5,825,646 | * 10/1998 | Keeler et al. .......................... | 700/44 |
| 5,922,079 | * 7/1999 | Booth et al. .......................... | 714/26 |
| 5,993,050 | * 11/1999 | Miura ....................................... | 703/2 |
| 6,058,258 | * 5/2000 | Cullum et al. .......................... | 703/2 |

FOREIGN PATENT DOCUMENTS

| | | | |
|---|---|---|---|
| 0 702 212 A2 | 9/1995 | (EP) | G01F/1/84 |
| 0 791 807 A2 | 8/1997 | (EP) | G01F/1/84 |
| WO 94/25933 | 11/1994 | (WO) . | |

OTHER PUBLICATIONS

Patterson et al., "Microwave Device Modelling Using Systematic Optimization Techniques", IEE Colloquium on Computer Based Tools for Mocrowave Engineers, pp. 3/1–3/4, 1991.*

Chan et al., "Sensitivity Analysis of Model Output: Variance–Based Methods Make the Difference", Proceedings of the 1997 Winter Simulation Conference, pp. 261–268. Dec. 1997.*

(List continued on next page.)

*Primary Examiner*—Kevin J. Teska
*Assistant Examiner*—Douglas W. Sergent
(74) *Attorney, Agent, or Firm*—Wolf Greenfield & Sacks, P.C.

(57) ABSTRACT

The present invention provides a description of the behavior of a model that indicates the sensitivity of the model in subspaces of the input space and which indicates which dimensions of the input data are salient in subspaces of the input space. By implementing this description using a decision tree, the subspaces and their salient dimensions are both described and determined hierarchically. A sensitivity analysis is performed on the model to provide a sensitivity profile of the input space of the model according to sensitivity of outputs of the model to variations in data input to the model. The input space is divided into at least two subspaces according to the sensitivity profile. A sensitivity analysis is performed on the model to provide a sensitivity profile of each of the subspaces according to sensitivity of outputs of the model to variations in data input to the model.

9 Claims, 3 Drawing Sheets

OTHER PUBLICATIONS

Salim et al., "Modeling of Magnetic Field Sensitivity of Bipolar Magnetoresistors using HSPICE", IEEE Transactions on CAD of Integrated Circuits, vol. 14, Issue 4, pp. 464–469, Apr. 1995.*

Starzyk et al, "Automated Testing Using Circuit Decomposition", 8th IEEE Instrumentation and Measurement Tech. Conf., pp. 514–519. May 1991.*

Lee et al., "Invariant Subspace Parametric Sensitivity (ISPS) of Structure Preserving Power System Models", IEEE Transactions on Power Systems, vol. 11, Issue 2, pp. 845–850, May 1996.*

Swindlehurst, A. L., "Robust Algorithms for DirectionFinding in the Presence of Model Errors", Fifth ASSP Workshop on Spectrum Estimation and Modeling, pp. 362–366, Oct. 1990.*

Sethi et al., "Structure–Driven Induction of Decision Tree Classifiers Through Neural Learning", Pattern Recognition, vol. 30, No. 11, pp. 1893–1904, 1997.

Engelbrecht et al., "Determining The Significance Of Input Parameters Using Sensitivity Analysis", abstract, Jun. 1995.

Guo et al., "Sensitivity Analysis and Applications to nuclear power plant", IEEE, pp. 453–458, Jun. 1992.

* cited by examiner

COMPUTER SYSTEM AND PROCESS FOR EXPLAINING BEHAVIOR OF A MODEL THAT MAPS INPUT DATA TO OUTPUT DATA

BACKGROUND

Several techniques are used to model multidimensional data by mapping multidimensional input values to multidimensional output values. Such models often are used to recognize hidden predictive patterns in a data set. The kinds of problems for which a model may be used include clustering, classification and estimation of data in the data set. There are several types of models that are commonly used, such as probabilistic neural networks, generalized regression neural networks, Gaussian radial basis functions, decision trees (such as, K-D trees, neural trees and classification and regression trees), neural networks, Kohonen networks and associative algorithms.

Most modeling techniques are procedural but not declarative. In other words, a model maps input values to output values. This mapping does not convey the actual meaning or significance of what the model is doing, i.e., its behavior. It is difficult to predict how the model behaves in response to new inputs or what dimensions of the input are most relevant to the behavior of the model.

This problem is compounded when the input data includes a large number of dimensions. In order to ensure that a model is based on relevant input dimensions, various statistical techniques are used to analyze a data set that will be used to create a model in order to identify those dimensions that are salient to the problem to be modeled. A model is created using only the salient dimensions for the input. Example statistical techniques for identifying these salient dimensions include chi-squared automatic interaction detection (CHAID), correlation, principle component analysis, and sensitivity analysis.

Such techniques for identifying the salient dimensions used to create a model still do not provide an explanation of the behavior of the created model. In particular, some dimensions may be salient only in a subspace of the input data and therefore have an impact on the behavior of the model only in that subspace. To assist in understanding the behavior of a model, another kind of statistical technique, called rule induction, often is used. Rule induction is described, for example, in C4.5: *Programs for Machine Learning,* by J. Ross Quinlan, Morgan Kaufman Publishers, 1993. A computer program having the same name ("C4.5") also is available from that author and publisher. This program uses data directly to derive rules. Other rule induction techniques use a model to derive rules. These techniques provide a tree structure that explains the behavior of a model as a collection of rules. Although these rules may help to explain the behavior of the model, the rules often are too numerous and too complex for a human to interpret as easily as one would like. It also is difficult to extract from these rules an explanation of which input values are important in each subspace of the input data that the tree defines.

SUMMARY

The present invention provides a description of the behavior of a model that indicates the sensitivity of the model in subspaces of the input space. For example, the description may indicate which dimension or dimensions of the input data are salient in the subspaces of the input space. By implementing this description using a decision tree, the subspaces and their salient dimensions are both described and determined hierarchically.

Accordingly, one aspect is a computer-implemented process for creating a description of the behavior of a model indicating sensitivity of the model in subspaces of an input space of the model. Sensitivity analysis is performed on the model to provide a sensitivity profile of the input space of the model according to sensitivity of outputs of the model to variations in data input to the model. The input space is divided into at least two subspaces according to the sensitivity profile. A sensitivity analysis is performed on the model to provide a sensitivity profile of each of the subspaces according to sensitivity of outputs of the model to variations in data input to the model.

Another aspect is a computer system for creating a description of the behavior of a model indicating sensitivity of the model in subspaces of an input space of the model. Sensitivity analysis is performed on the model to provide a sensitivity profile of the input space of the model according to sensitivity of outputs of the model to variations in data input to the model. The input space is divided into at least two subspaces according to the sensitivity profile. A sensitivity analysis is performed on the model to provide a sensitivity profile of each of the subspaces according to sensitivity of outputs of the model to variations in data input to the model.

In another aspect, a computer system for creating a description of the behavior of a model indicating sensitivity of the model in subspaces of an input space of the model includes a sensitivity analysis module and a data splitter. The sensitivity analysis module provides an indication of a sensitivity profile of the input space of the model according to sensitivity of outputs of the model to variations in data input to the model. The data splitter has a first input for receiving an input data set and a second input for receiving the indication of the sensitivity profile output by the sensitivity analysis module, and has an output for providing at least two subspaces of the input space according to a segmentation performed according to the sensitivity profile indicated by the sensitivity analysis module.

In one embodiment, the sensitivity profile is a rank order of dimensions of the input space. The input space thus may be split according to the dimension to which outputs of the model are most sensitive.

DETAILED DESCRIPTION

The following detailed description should be read in conjunction with the attached drawing in which similar reference numbers indicate similar structures. All references cited herein are hereby expressly incorporated by reference.

Figure 1:
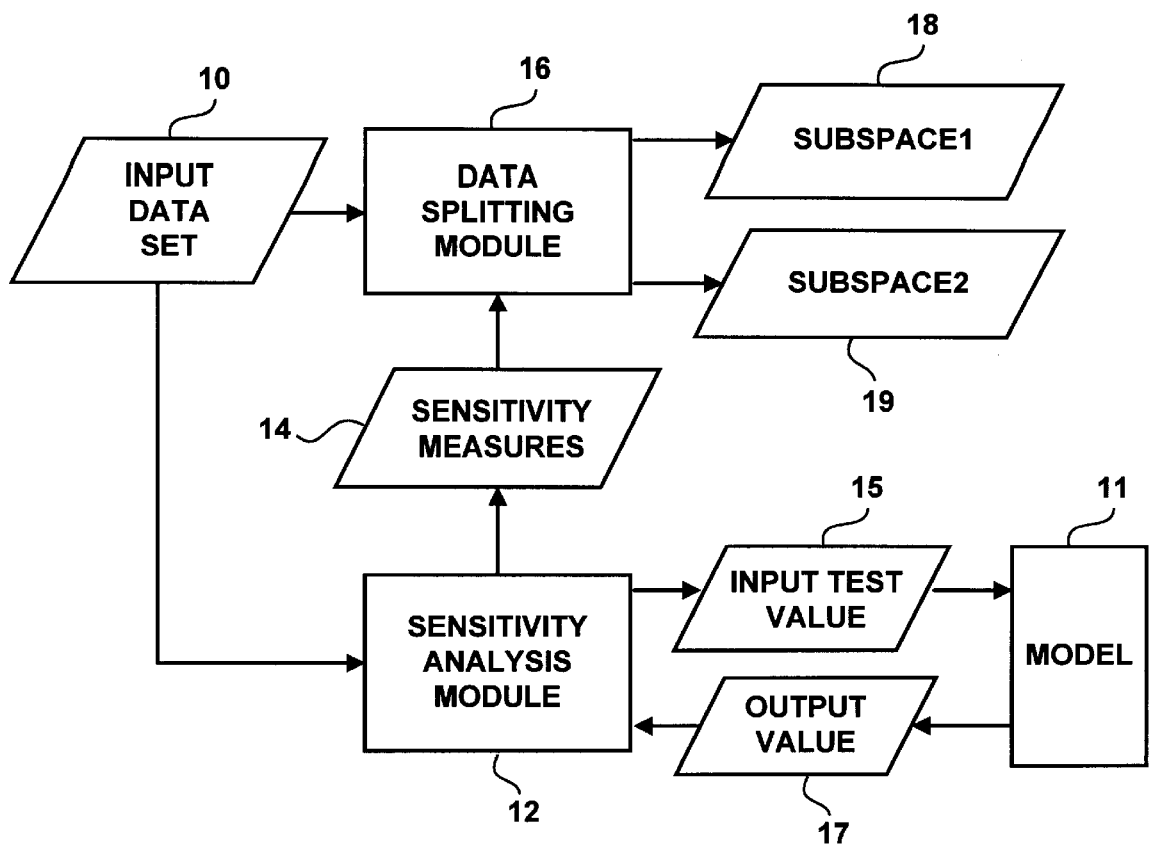
FIG. 1 is a block diagram of one embodiment of a system which splits an input data set into at least two subspaces.

FIG. 1 is a block diagram illustrating data flow of one embodiment of a system for generating a description of the behavior of a model that indicates the sensitivity of the model in subspaces of the input space which implements the description using a decision tree. Other trees, graphs, rules or similar representations also may be used. A model 11 typically is created by selecting a kind of model appropriate for a kind of problem. Given a kind of problem and a kind of model, input fields that affect the solution to the defined problem are identified and standardized. Any target output fields also are identified and standardized. A training data set to be used to generate or train the model then is prepared. The training data set is typically a subset of a database or other large data set. Each datum in a data set typically is defined by a vector of one or more dimensions corresponding to the selected input fields and of one or more output dimensions corresponding to the selected output fields. The training data set generally is created using stratified sampling of a large data set. For example, a large customer database containing over several million records may be sampled to create a training set of approximately several thousand entries that generally represents the overall customer base. The training data set is then applied to the model using a training procedure and a model 11 is created.

After the model 11 is created, a description of the behavior of the model may be generated. An input data set 10 is selected for this purpose. The input data set 10 may be the training set, may be a subset of the training set, may be another stratified sample of the database or large data set, or may be a set of values generated at random using the model and the minimum and maximum values of each input dimension from the training set.

The input data set is input to a sensitivity analysis module 12 which determines sensitivity measures 14, in accordance with typical techniques. Such techniques are described, for example, in *Data Mining Techniques,* by Michael Berry and Gordon Linoff, John Wiley and Sons, June 1997.

In one embodiment, the sensitivity analysis module applies input test data 15 to the model 11 and receives output data 17 from the model. The input test data are generated from the data in the input data set 10. In particular, for each datum in the input data set, input test data are generated by varying the values in the datum for each dimension. The variation for each dimension is defined by a value, e.g., called "h," that is added to and subtracted from the value of the dimension of each datum. These varied input data are applied to the model to obtain the output data 17 from which a partial derivative may be computed in the input space at each datum for each dimension of the datum. This computation is commonly called a three point derivative. The computation of the partial derivatives used to determine the sensitivity measures may be performed once for the entire input data set. Processing of subsequent subspaces does not require recalculation of these partial derivatives. However, the sensitivity measures for each subspace are recomputed using the partial derivatives only from the data in the subspace.

The value, "h," is problem dependent and thus may be user-defined. A typical value is ½% to 5% of the range in the input data set of the values for that dimension. If the values in the; input data set are normalized, for example by using a z-score, then a suitable value of "h" typically ranges from 0.005 to 0.05.

The squares of the partial derivatives for each dimension are aggregated over the input data set to obtain the sensitivity measures 14. For example, the sum over the input data set of the squared partial derivatives for each dimension may be calculated. These sensitivity measures provide a sensitivity profile of the input space of the model. From this sensitivity profile, one or more dimensions of the input data set to which the output is most sensitive to variation may be identified. For example, the sensitivity measures of the dimensions of the input data may be a rank ordered and the dimension having the highest sensitivity may be selected.

The computation of the partial derivatives used in determining the sensitivity measures may be parallelized. A copy of the model being analyzed and a sensitivity analysis module may be provided to each of a plurality of processors. The input data set may be partitioned, and each partition of the data may be provided to a separate processor. The computation of partial derivatives for each datum may be performed in parallel on each partition by each processor. A system for performing such parallel processing is shown, for example, in U.S. patent application Ser. No. 08/627,801, filed Mar. 25, 1996.

In FIG. 1, a data splitting module 16 receives the input data set 10 and the sensitivity measures 14 and splits the input data set into subspaces 18 and 19 according to the sensitivity profile defined by the sensitivity measures 14. The split may be on the dimension which is most salient, or may be along an axis in two or more dimensions which are most salient. The split is performed such that one subspace contains the input data for which the value in the selected dimension is less than (or equal to) a selected threshold; the other subspace contains the input data for which the value in the selected dimension is greater than (or equal to) the threshold. Either side of the split may be programmed to receive data having a value equal to the threshold.

The threshold may be selected in many ways. Example thresholds include the mean, median or mode of the values in the input data for the selected dimension, or a function of the sensitivity measures or a function of the values used to compute the sensitivity measures. In one embodiment the threshold is computed by ordering the input data set according to the values of the selected dimension. In particular, if each input datum $x_i$; is enumerated as $x_1, x_2 \ldots x_N \in [x_{min}, x_{max}]$, AND if the input data $x_i$ are ordered from minimum to maximum with $x_1$ being the datum with the smallest value of a selected dimension and $x_N$ being the datum with the largest value of the selected dimension, then a suitable threshold is value of the selected dimension of the datum $x_m$ which is closest to the middle of the set $\{x_1, \ldots, x_N\}$ with respect to the sensitivity measure. That is, the threshold is the value of the selected dimension of datum $x_m$ such that $$\sum_{i=1}^{m} \left(\frac{\delta f}{\delta x}\right)^2$$

is close as possible to $$\frac{\sum_{i=1}^{N} \left(\frac{\delta f}{\delta x}\right)^2}{2}$$

Each of the subspaces obtained by splitting the input data in this manner may be further split in the same way until a predetermined number of subspaces or a predetermined size of a subspace has been reached. By recursively splitting each subspace, each split defined by the data splitting module 16 may be represented by a decision tree. Each node of the decision tree stores an indication of the dimension which is most salient for the input data and the threshold used by the node for splitting the input data into subspaces. The decision tree thus hierarchically defines, for each subspace of the input space, the dimension and threshold used to create the subspace and the dimension which is most salient in that subspace.

Figure 2:
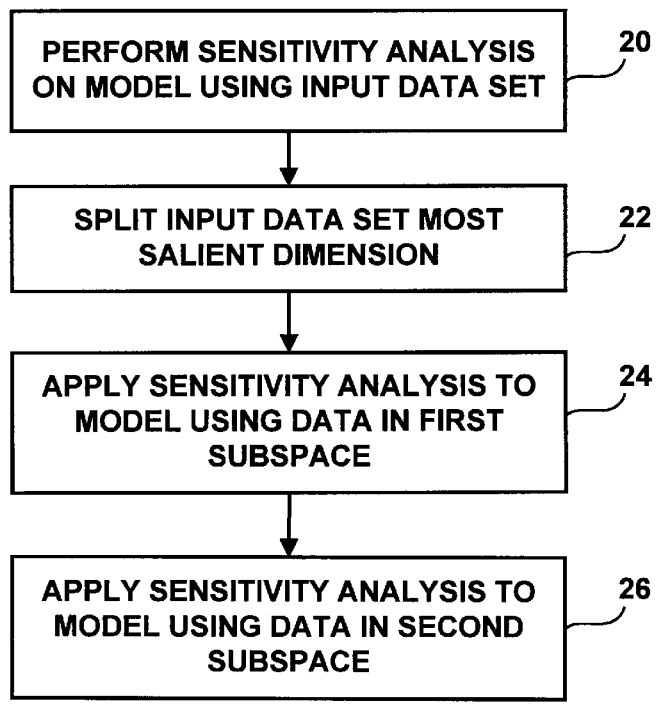
FIG. 2 is a flowchart describing the use of the system shown in FIG. 1.

A flow chart describing the operation of the embodiment shown in FIG. 1 will now be described in connection with FIG. 2. In particular, sensitivity analysis is performed on the model 11 using the input data set 10 in step 20. The input data set 10 is split, for example by data splitting module 16, in step 22 on the most salient dimension. The process of FIG. 2 is performed recursively on the subspaces, e.g., subspaces 18 and 19, resulting from step 22, as shown in steps 24 and 26. Steps 24 and 26 may be performed serially or may be performed in parallel on separate processors. As noted above, the computation of the partial derivatives used to determined the sensitivity measures may be performed once for the entire input data set. Processing of subsequent subspaces does not require recalculation of these partial derivatives. However, the sensitivity measures for each subspace are recomputed using the partial derivatives only from the data in the subspace.

Figure 3:
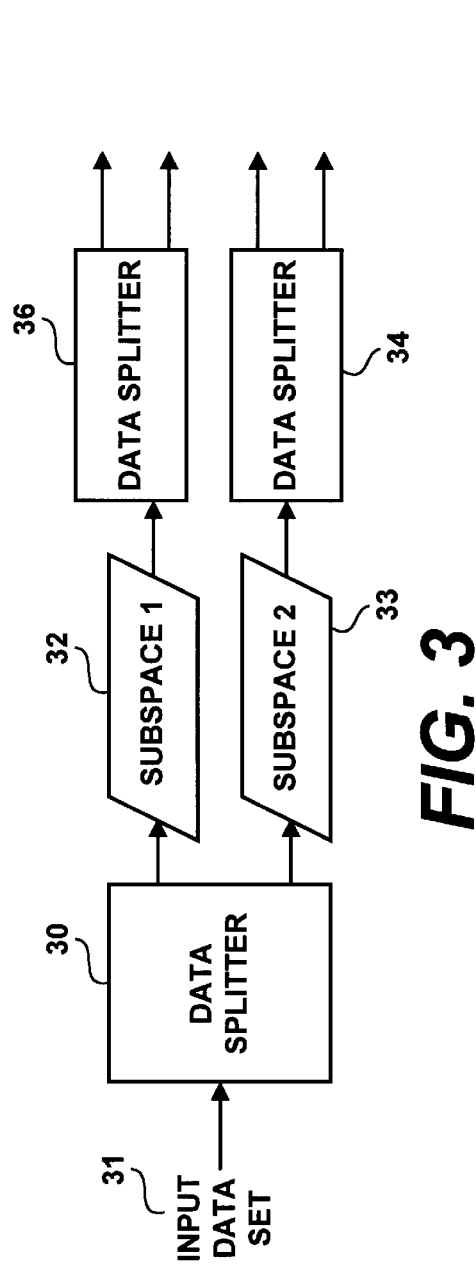
FIG. 3 is a block diagram illustrating how the system shown in FIG. 1 may be cascaded to generate a decision tree.

The splitting of subspaces also may be performed in parallel and in a pipelined manner, as shown in FIG. 3. In particular, the sensitivity analysis module 12 and data splitting module 16 of FIG. 1 may be considered a data splitter 30 as shown in FIG. 3. The model 11 is not shown in this figure, because it may be considered to be used in a preprocessing step to generate the partial derivatives from which sensitivity measures are computed. A data splitter 30 receives input data 31 and generates output subspaces 32 and 33. Additional data splitters 34 and 36 may be provided to operate in parallel on the output subspaces 32 and 33 to provide additional subspaces.

Figure 4:
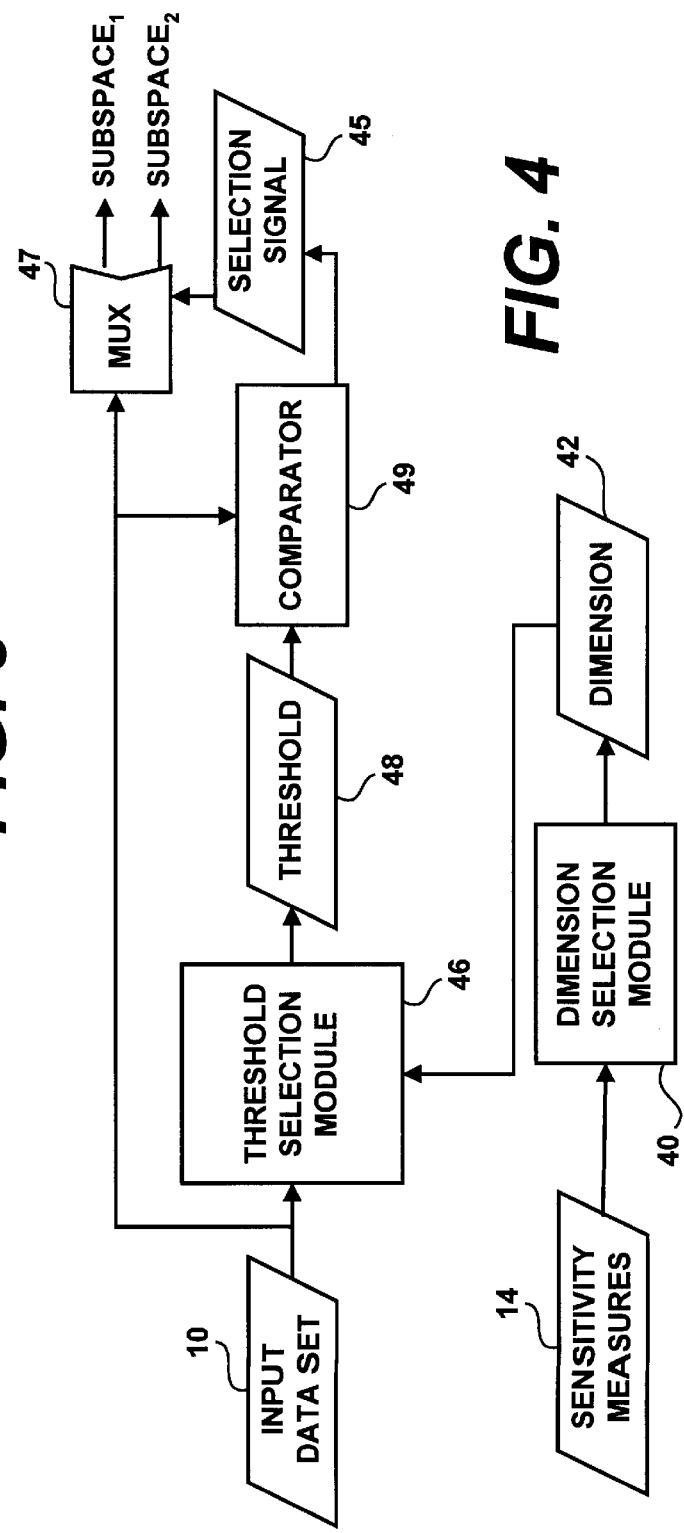
FIG. 4 is a more detailed block diagram of one embodiment of the data splitting module of FIG. 1.

A more detailed block diagram of a data splitting module 16 of FIG. 1 in one embodiment will now be described in connection with FIG. 4. In FIG. 4, the sensitivity measures are used by a dimension selection module 40 to identify a dimension 42 on which the input data set 10 will be split. A threshold 48 is selected by a threshold selection module 46 for the selected dimension 42. This selection may be performed using the input data set 10, for example by identifying the mean, median or mode or other function of the values in that dimension in the input data set. The threshold 48 is input into a comparator 49. Each input datum also is input to the comparator 49 for comparison with the threshold. The result of this comparison provides a selection signal 45 which is applied to a control input of a multiplexer 47. The multiplexer 47 directs the input datum to either a first output or a second output depending on the selection signal 45. The data output by the multiplexer 47 thus falls into one of two subspaces as specified by the comparator.

Figure 5:
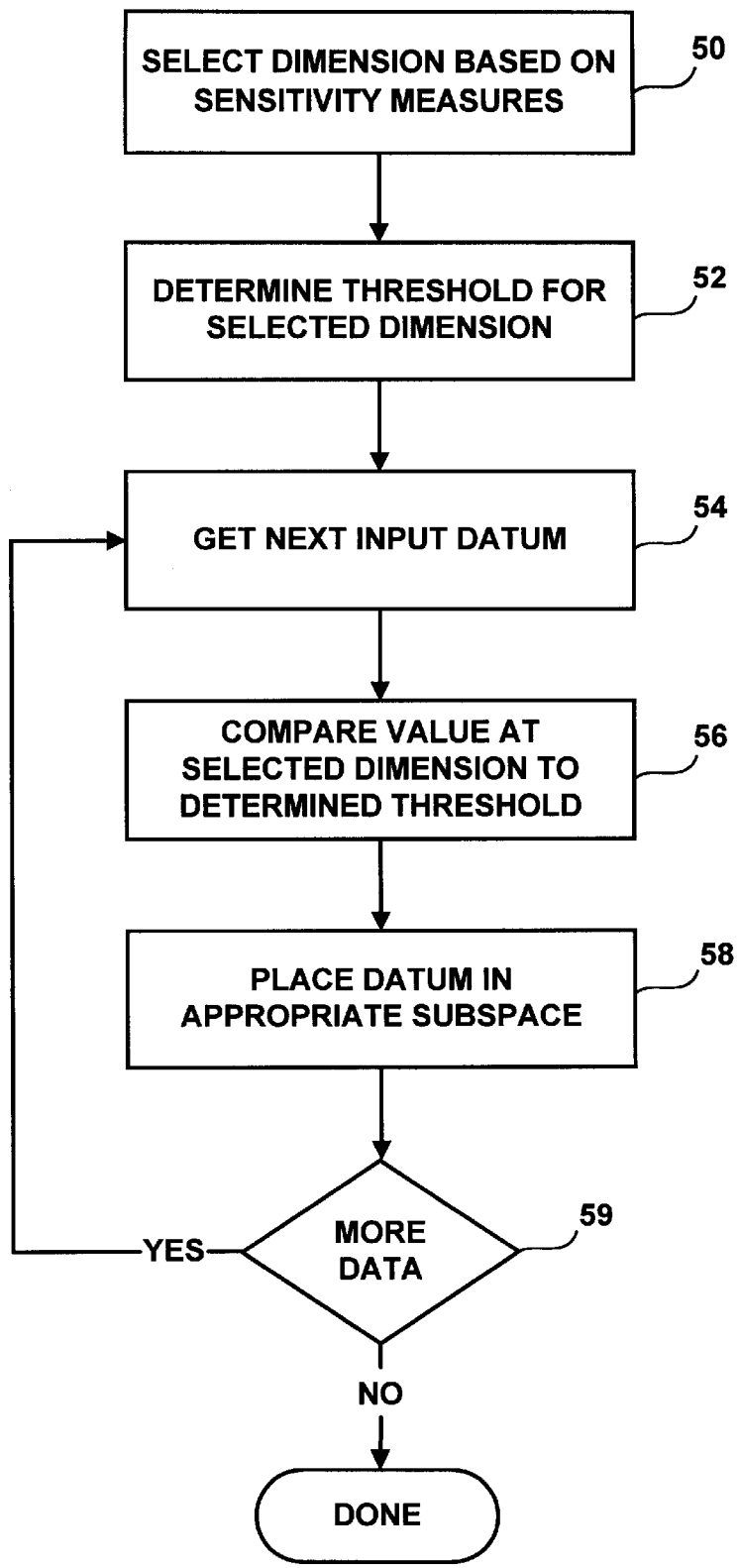
FIG. 5 is a flowchart describing in more detail the operation of FIG. 4.

The flow chart of FIG. 5 describes in more detail the operation of the circuit of FIG. 4. First, a dimension is selected based on the sensitivity measures as indicated in step 50. A threshold for the selected dimension is determined in step 52 from the input data set. For each input datum, as indicated in step 54, the value of the selected dimension is compared to the determined threshold in step 56. According to the comparison, the datum is placed in the appropriate subspace in step 58. Steps 56 and 58 are repeated for each input datum as indicated in steps 54 and 59.

The description of the behavior of the model may be presented to a user for example by a computer display or printout in a number of formats. By representing the description using a decision tree, each node of the tree may be described using a rule in a first order predicate calculus. The user may traverse the tree and interactively expand or contract each node to view the description for each node of the tree.

A general purpose computer system may be used to implementing the system shown above using a computer program. Such a computer system typically includes a main unit connected to both an output device which displays information to a user and an input device which receives input from a user. The main unit generally includes a processor connected to a memory system via an interconnection mechanism. The input device and output device also are connected to the processor and memory system via the interconnection mechanism.

It should be understood that one or more output devices may be connected to the computer system. Example output devices include a cathode ray tube (CRT) display, liquid crystal displays (LCD), printers, communication devices such as a modem, and audio output. It should also be understood that one or more input devices may be connected to the computer system. Example input devices include a keyboard, keypad, track ball, mouse, pen and tablet, communication device, and data input devices such as sensors. It should be understood the invention is not limited to the particular input or output devices used in combination with the computer system or to those described herein.

The computer system may be a general purpose computer system which is programmable using a computer programming language, such as "C++," JAVA or other language, such as a scripting language or even assembly language. The computer system may also be specially programmed, special purpose hardware. In a general purpose computer system, the processor is typically a commercially available processor, of which the series x86 and Pentium processors, available from Intel, and similar devices from AMD and Cyrix, the 680X0 series microprocessors available from Motorola, the PowerPC microprocessor from IBM and the Alpha-series processors from Digital Equipment Corporation, are examples. Many other processors are available. Such a microprocessor executes a program called an operating system, of which WindowsNT, Linux, UNIX, System 7, DOS, VMS and OS8 are examples, which controls the execution of other computer programs and provides scheduling, debugging, input/output control, accounting, compilation, storage assignment, data management and memory management, and communication control and related services. The processor and operating system define a computer platform for which application programs in high-level programming languages are written. A parallel processing operating environment also may be used such as the Orchestrate parallel operating shell from Torrent Systems, Inc., of Cambridge, Mass., such as described in U.S. patent application Ser. No. 08/627,801, filed Mar. 25, 1996.

The memory system typically includes a computer readable and writeable nonvolatile recording medium, of which a magnetic disk, a flash memory and tape are examples. The disk may be removable, known as a floppy disk, or permanent, known as a hard drive. A disk has a number of tracks in which signals are stored, typically in binary form, i.e., a form interpreted as a sequence of one and zeros. Such signals may define an application program to be executed by the microprocessor, or information stored on the disk to be processed by the application program. Typically, in operation, the processor causes data to be read from the nonvolatile recording medium into an integrated circuit memory element, which is typically a volatile, random access memory such as a dynamic random access memory (DRAM) or static memory (SRAM). The integrated circuit memory element allows for faster access to the information by the processor than does the disk. The processor generally manipulates the data within the integrated circuit memory and then copies the data to the disk when processing is completed. A variety of mechanisms are known for managing data movement between the disk and the integrated circuit memory element, and the invention is not limited thereto. It should also be understood that the invention is not limited to a particular memory system.

It should be understood the invention is not limited to a particular computer platform, particular processor, or particular high-level programming language. Additionally, the computer system may be a multiprocessor computer system or may include multiple computers connected over a computer network. It should be understood that each module may be separate modules of a computer program, or may be separate computer programs. Such modules may be operable on separate computers or processors and may be executed in parallel or serially.

Having now described a few embodiments, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

What is claimed is:

1. A computer-implemented process for creating a description of the behavior of a model indicating sensitivity of the model in subspaces of an input space of the model, comprising:

performing a sensitivity analysis on the model to provide a sensitivity profile of the input space of the model according to sensitivity of outputs of the model to variations in data input to the model;

dividing the input space into at least two subspaces according to the sensitivity profile; and performing a sensitivity analysis on the model to provide a sensitivity profile of each of the subspaces according to sensitivity of outputs of the model to variations in data input to the model.

2. The computer-implemented process of claim 1, wherein the sensitivity profile is a rank order of dimensions of the input space.

3. The computer-implemented process of claim 2, wherein the step of dividing the input space includes the step of dividing the input space according to the dimension to which outputs of the model are most sensitive.

4. A computer system for creating a description of the behavior of a model indicating sensitivity of the model in subspaces of an input space of the model, comprising:

means for performing a sensitivity analysis on the model to provide a sensitivity profile of the input space of the model according to sensitivity of outputs of the model to variations in data input to the model;

means for dividing the input space into at least two subspaces according to the sensitivity profile; and means for performing a sensitivity analysis on the model to provide a sensitivity profile of each of the subspaces according to sensitivity of outputs of the model to variations in data input to the model.

5. The computer system of claim 4, wherein the sensitivity profile is a rank order of dimensions of the input space.

6. The computer system of claim 5, wherein the means for dividing the input space includes the step of dividing the input space according to the dimension to which outputs of the model are most sensitive.

7. A computer system for creating a description of the behavior of a model indicating sensitivity of the model in subspaces of an input space of the model, comprising:

a sensitivity analysis module providing an indication of a sensitivity profile of the input space of the model according to sensitivity of outputs of the model to variations in data input to the model;

a data splitter module having a first input for receiving an input data set and a second input for receiving the indication of the sensitivity profile output by the sensitivity analysis module, and having an output for providing at least two subspaces of the input space according to a segmentation performed according to the sensitivity profile indicated by the sensitivity analysis module;

a control mechanism for providing the subspaces output by the data splitter module as input spaces for further sensitivity analysis and segmentation.

8. The computer system of claim 7, wherein the sensitivity profile is a rank order of dimensions of the input space.

9. The computer system of claim 8, wherein the data splitter divides the input space according to the dimension to which outputs of the model are most sensitive.

* * * * *